US006206952B1

(12) United States Patent
Corbin et al.

(10) Patent No.: US 6,206,952 B1
(45) Date of Patent: Mar. 27, 2001

(54) METHOD OF SEPARATING AND SELECTIVELY REMOVING HYDROGEN CONTAMINANT FROM PROCESS STREAMS

(75) Inventors: David Richard Corbin, West Chester; Vinci Martinez Felix, Kennett Square, both of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/194,743

(22) PCT Filed: Jun. 2, 1997

(86) PCT No.: PCT/US97/09480

§ 371 Date: Dec. 2, 1998

§ 102(e) Date: Dec. 2, 1998

(87) PCT Pub. No.: WO97/46315

PCT Pub. Date: Dec. 11, 1997

Related U.S. Application Data
(60) Provisional application No. 60/019,199, filed on Jun. 6, 1996.

(51) Int. Cl.⁷ .................................................. B01D 53/02
(52) U.S. Cl. ............................................. 95/116; 95/902
(58) Field of Search ........................................ 95/116, 902

(56) References Cited

U.S. PATENT DOCUMENTS

| 4,466,812 | 8/1984 | Takaishi et al. ........................ 55/68 |
| 5,233,107 | 8/1993 | Jansen ................................... 570/179 |
| 5,944,876 * | 8/1999 | Corbin et al. ........................... 95/116 |

FOREIGN PATENT DOCUMENTS

| 2947498 | 5/1981 | (DE) ............................... C01C/3/04 |
| 9746315 * | 12/1997 | (WO) . |
| 9855206 * | 12/1998 | (WO) . |

OTHER PUBLICATIONS

Yoon et al., *J. Phys. Chem.*, 96, 4997–5000, 1992.
Weitkamp et al., *Butterworth–Heinemann Pub.*, 2, 11–19, 1992.
Efstathiou et al., *J. of Catalysts*, 135, 135–146, 1992.
Krishnan et al., *Chemical Communications*, 3, 395–396, Feb. 7, 1996.
Krishnan et al., *Catalysis Today*, 31, No. 3–4, 199–295, Dec. 5, 1996.
Corbin et al., *Journal of the American Chemical Society*, 112, No. 12, 4821–4830, 1990.

* cited by examiner

*Primary Examiner*—Tom Dunn

(57) ABSTRACT

A method of separating and selectively removing hydrogen contaminant from hydrogen-containing product and by-product process streams is disclosed. Separation and removal occur when certain Cd-exchanged zeolite rho compositions are placed in contact with a hydrogen-containing process stream. A hydrogen-encapsulated zeolite rho composition is formed by practice of the method.

14 Claims, No Drawings

METHOD OF SEPARATING AND SELECTIVELY REMOVING HYDROGEN CONTAMINANT FROM PROCESS STREAMS

This is a 371 application of PCT/US97/09480 filed on Jun. 2, 1997, which claims priority based on Provisional Application Ser. No. 60/019,199, filed on Jun. 6, 1996.

FIELD OF INVENTION

The invention generally relates to separating and removing hydrogen contaminant from hydrogen-containing process streams and more particularly to selectively removing hydrogen from such process streams using Cd-exchanged zeolite rho compositions.

BACKGROUND OF THE INVENTION

Zeolites are widely used as sorbents in many applications that use the zeolite's ability to entrap liquids and gases. One potential application is the development of zeolite storage materials for gases. In addition, zeolites offer the possibility of selective separation of gases from mixed streams.

Zeolites are crystalline aluminosilicates with framework structures. The framework structure contains channels and cages of molecular dimensions. Cations and small molecules can reside on the face of the framework or within the pores, also called cages. Zeolite rho is a typical example, with a 3-dimensional network of alpha-cages (cubo-octahedra) which are connected to each other by octahedral prisms, or in other words, a body centered cubic structure of alpha cages. Selective blocking of pores in zeolites can be achieved by ion-exchanging the zeolites with different sized cations, thereby altering the sorption properties of the zeolite.

There have been several attempts to encapsulate hydrogen gas in various metal-exchanged zeolites. For example, Yoon and Heo (J. Phys. Chem., Vol. 96, pp. 4997–5000, 1992) studied encapsulation in $Cs_{2.5}$-zeolite A at pressures ranging from 10–129 atm (1.01–13.1 MPa) and temperatures ranging from 100–350° C., and achieved a maximum amount of 871 $\mu$mol/g of $H_2$ encapsulation.

Weitkamp et al. (Proc. 9th Intl. Zeolite Conf., Montreal 1992, Eds. Ballmoos et al., Butterworth-Heinemann Pub., vol. 2, pp. 11–19) used various metal-exchanged zeolites including zeolite-rho. However, the largest amount Of $H_2$ that they were able to encapsulate was 410 $\mu$mol/g using zeolite NaA at 300° C. and 10.0 MPa after 15 min. They were also only able to encapsulate 22.3 $\mu$mol/g of $H_2$ using zeolite H-rho under the same conditions.

Efstathiou et al. (J. of Catalysts, vol. 135, pp. 135–146, 1992) studied $B_2$ encapsulation in Cs, Ni, and Eu-exchanged zeolite A at 1 atm (0.1 MPa) and 37–300° C. They achieved the largest amount of $H_2$ encapsulation, 3.50 $\mu$mol/g, using NaA at 300° C.

Takaishi et al. (U.S. Pat. No. 4,466,812) disclose a hydrogen encapsulating zeolite material composed of a Na zeolite A ion-exchanged with cesium and a divalent metal. $H_2$ encapsulation was performed at 300° C. or less at pressures of 97 atm (9.8 MPa). No specific examples are provided for a composition containing Cd, although Cd is generally disclosed as one of the divalent metals.

What are needed are zeolite compositions capable of encapsulating hydrogen in larger amounts and at lower pressure than the prior art. In addition, a method of separating and selectively removing hydrogen from hydrogen-containing process streams using said zeolite compositions is also needed. Other objects and advantages of the present invention will become apparent to those skilled in the art upon reference to the detailed description of the invention which hereinafter follows.

SUMMARY OF THE INVENTION

The present invention provides a method of separating and removing hydrogen from a hydrogen-containing process stream comprising contacting a hydrogen-containing process stream with a Cd-exchanged zeolite rho composition of the formula:

$$Cd_wM1_xM2_yM3_zSi_aAl_bO_{96}$$

wherein: M1, M2 and M3 are each selected from the group consisting of Li, Zn, Rb, Sr, H, $NH_4$, Ca, K, Na, Mg, Ba and Cs;

w is from about 1 to about 6;

x, y and z are each 0–6;

a is 36–48; and b is in excess of 0 and up to 12, with the proviso that a+b=48.

Preferably, w is about 5 or about 6 in the formula. Typically, at least one of x, y, or z is greater than zero and the Si:Al molar ratio is from about 3:1 to about 5:1.

The Cd-exchanged zeolite rho compositions can surprisingly separate and remove hydrogen from process streams in relatively large amounts (e.g., at least 150 $\mu$mol/g of hydrogen) even at lower pressures like 1 atmosphere. Preferably, the hydrogen-containing process stream contains hydrogen contaminant in concentrations of from about 0.0001 to about 15 wt. %. Such streams-could also contain other gases in addition to hydrogen such as, for example, HCl, HF, HBr, HI, $Cl_2$, $N_2$, CO, $CO_2$, Ne, Ar, Kr, Xe, He, $NH_3$, $CH_4$, air and $H_2O$. The use of the above-defined Cd-exchanged zeolite rho compositions allows for the selective removal of hydrogen when other gases are also present.

As used herein, "hydrogen" means elemental hydrogen (e.g., gaseous $H_2$) as well as isotopes thereof, including, for example, deuterium and tritium.

DETAILED DESCRIPTION OF THE PREFERRED EMBODIMENTS

Zeolites can be generically described as complex aluminosilicates characterized by three-dimensional framework structures enclosing cavities occupied by ions and water molecules, all of which can move with significant freedom within the zeolite matrix. In commercially useful zeolites, the water molecules can be removed from or replaced within the framework structures without destroying the zeolite's geometry.

Zeolites can be generally represented by the following formula: $M_{2/n}O.Al_2O_3.xSiO_2.yH_2O$; wherein M is a cation of valence n, $x \geq 2$, and y is a number determined by the porosity and the hydration state of the zeolite, generally from 2 to 8. In naturally-occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

The dimensions which control access to the interior of the zeolite are determined not only by the tetrahedra forming a pore opening, but also by the presence or absence of ions in or near the pore. In the case of zeolite A, for example, access can be restricted by monovalent ions, such as $Na^+$ or $K^+$, which are situated in or near 8-ring openings as well as 6-ring openings. Access is enhanced by divalent ions, such as $Ca^{2+}$ which are situated only in or near 6-rings. Thus, KA and NaA exhibit effective pore openings of about 0.3 nm and 0.4 nm respectively, whereas CaA has an effective pore opening of about 0.5 nm.

Zeolite rho, the zeolite species employed in the method of the present invention, is a small-pore synthetic zeolite. One non-limiting, illustrative formula which describes zeolite rho is:

$$(Na,Cs)_{12}Al_{12}Si_{36}O_{96} \cdot 44H_2O.$$

The structure and synthesis of this zeolite rho are described by Robson et al., "Synthesis and Crystal Structure of Zeolite Rho—A new Zeolite Related to Linde Type A", Advances in Chemistry Series 121 (American Chemical Society 1973), and Robson, U.S. Pat. No. 3,904,738. The crystal structure of zeolite rho is also characterized, for example, by U.S. Pat. No. 4,806,689. The combined disclosures of these references are incorporated herein by reference.

Other cationic species can be exchanged for the $Na^+$ and $Cs^+$ present in rho zeolites using a variety of techniques. The number of cationic species that can be present in the zeolite is dependent on the valence of the cationic species. The total positive charge of the cations must equal the total anionic charge of the $AlO_2^-$ units present; in other words the metal cations present must be in such stoichiometric amounts to balance the electrostatic charge present.

The applicants have found that the above-described Cd-exchanged zeolite rho compositions can be used in the separation and selective removal of hydrogen from hydrogen-containing process streams (e.g., in chemical and nuclear plants). This use would result in an inexpensive method for separating and selectively removing hydrogen gas from a mixture with other gases, something that is needed in the art.

To help illustrate some of the possible applications, several examples of industrial processes are detailed below where a separation and removal method, as described above, may be utilized. Typically, removal could occur from process and waste gaseous streams containing hydrogen in concentrations of from about 0.0001 Lo about 15 wt. % although this range is not considered critical. It is anticipated that such streams could contain, for example, HCl, HF, HI, HBr, $Cl_2$, $N_2$, CO, $CO_2$, Ne, Ar, Kr, Xe, He, $NH_3$, $CH_4$, air and $H_2O$ in addition to hydrogen.

Hydrodechlorinations of halocarbons produce one mole of HCl for every mole of $H_2$ consumed in the process. Since $H_2$ is typically used in excess, there is the potential for a by-product stream of HCl containing significant amounts of $H_2$. Examples of this are the thermal hydrodechlorination of halocarbons such as CFC-114a and halocarbon mixtures such as CFC-12/HCFC-22 in the presence of $H_2$, which produce high value products like HFC-134a and HFC-32, respectively. Details of such a thermal hydrodechlorination process are described, for example, in U.S. Pat. Nos. 5,208,397; 5,300,713; 5,364,992; 5,430,204 and 5,446,219.

A by-product of the process is anhydrous HCl (AHCl) with $H_2$ as the major contaminant with as much as 3000 ppm (% wt). The presence of $R_2$ in the AHCl stream makes it difficult for the AHCl to be used directly as a feedstock for other processes such as oxychlorination. The value of the AHCl is lowered, and it has to be disposed of usually by contact/absorption in water, converting AHCl into aqueous HCl. The aqueous HCl is ultimately neutralized with lime or caustic for disposition as $CaCl_2$ or $NaCl_2$, respectively.

By-product AHCl is generated from numerous other manufacturing processes that involve processing or production of chlorinated compounds, such as vinyl chloride monomer (VCM) and toluene diisocyanate (TDI), among others. Several TDI plants worldwide practice a Bayer-Hoechst-Uhde HCl electrolysis process for converting aqueous HCl to $Cl_2$ and $H_2$. The AHCl is prepared for electrolysis by absorption initially in water which becomes a dilute hydrochloric acid. This absorption process serves a dual purpose as it allows inerts, such as $N_2$, CO, etc., to be removed from the process. Acid products from the absorption system are fed to electrolytic cells where a portion of the HCl is removed from the acid stream according to the reaction:

$$2HCl \xrightarrow{Electrolysis} Cl_2 + H_2$$

Dilute acid exiting the cells is circulated back to the adsorption system for reconcentration. The product gases, $H_2$ and $Cl_2$, exit the cells as separate streams and are fed to the cleanup systems. Product quality after treatment (for dry gas) of $Cl_2$ is about 99.5% volume with about 5000 ppm (% volume) $H_2$ contaminant as described by the Hoechst-Uhde brochure, "Chlorine and Hydrogen from Hydrochloric Acid by Electrolysis" (B&K XV 1000, 1/87).

Noble gases, namely, argon (Ar), helium (He), krypton (Kr), neon (Ne) and xenon (Xe) being inert are normally used as plasma generating gases or ionizing gases and/or quench gases in plasma-chemical processes involving hydrogen. Argon is the most commonly used noble gas due to its availability and lower cost compared to other noble gases. In plasma-chemical processes, Ar is recovered and recycled. It normally contains $H_2$ contaminants in several thousand ppm (% wt.). One example is described in U.S. Pat. No. 5,211,923; hydrogen and sulfur recovery from hydrogen sulfide wastes using Ar as a plasma gas. The reaction gases, including Ar, $H_2$, and S, among others, exit the plasma reactor at a temperature in the range of about 150–450° C. and at a pressure in the range of about 0.5–2.0 atm.

Hydrogen cyanide (HCN) is typically produced commercially by two methods, the Andrussow process and Degussa process. The major difference between the two processes is that the Andrussow process is carried out in the presence of air whereas the Degussa Process is performed in the absence of air.

The synthesis of HCN by the Andrussow Process can be described by the following overall reaction:

$$CH_4 + NH_3 + 3/2 O_2 \rightarrow HCN + 3H_2O$$

Although the stoichiometric reaction between ammonia and methane produces only HCN and water, a number of side reactions lead to the generation of undesired by-products including nitrogen, hydrogen, carbon monoxide, and carbon dioxide. Typical effluent gas compositions produced by the Andrussow process are characterized in wt. % as:

| | |
|---|---|
| HCN | 7.6% |
| $CH_4$ | 0.3% |
| $NH_3$ | 0.6% |
| CO | 3.9% |
| $CO_2$ | 0.3% |

-continued

| | |
|---|---|
| $H_2O$ | 23.5% |
| $H_2$ | 13.3% |
| $N_2$ | 50.5% |

The main reaction for the production of HCN in the Degussa process is:

$$CH_4 + NH_3 \rightarrow HCN + 3H_2$$

In addition to the main reaction, partial decomposition of ammonia also takes place according to the formula:

$$NH_3 \rightarrow 1/2 N_2 + 3/2 H_2$$

Ammonia and methane are fed in a 1:1 molar ratio at a short residence time. The conversion of methane and ammonia is greater than 99 mole % with a selectivity of 90 mole % of HCN. Since the Degussa process is performed in the absence of air, the number of undesired waste gases are less than those generated by the Andrussow process. Typical effluent gas compositions produced by the Degussa process are characterized in wt. % as:

| | |
|---|---|
| $NH_3$ | 1.3% |
| $CH_4$ | 3.6% |
| HCN | 22.0% |
| $H_2$ | 71.2% |
| $N_2$ | 1.9%. |

In these and other gaseous process streams, one general procedure that could be used to separate and selectively remove hydrogen from other gases in a hydrogen-containing process stream would be to pass the cases over or through a bed of the above-described Cd-exchanged zeolite rho compositions at a temperature that would ultimately allow encapsulation of the $H_2$ on or within the compositions but would minimize the encapsulation of the other gases present. This temperature is typically at least about 50° C. but less than about 500° C., preferably between about 100 and about 300° C. However, it is anticipated and should be understood that room temperature (~20° C.) could be utilized with a corresponding increase in pressure.

The hydrogen can thereafter be released from the Cd-exchanged zeolite rho compositions by heating the compositions to higher temperatures and/or by reducing the pressure. Typically, this is a temperature greater than about 100° C., although it is dependent, among other things, on the temperature of encapsulation.

As noted above, encapsulation of hydrogen can take place in large amounts without having to go up to high pressures which are necessary in the prior art. Pressures from about 900 atm all the way down to 1 atmosphere can be conveniently used for encapsulation. Subsequent controlled release of hydrogen from the inventive compositions can be accomplished by a decapsulation process which is fundamentally simple and does not require high temperatures as is usually the case with metal hydrides. As noted above, this can be accomplished by heating the hydrogen-encapsulated zeolite rho compositions to slightly higher temperatures and/or by reducing the pressure.

Various terms may be used to describe the encapsulation process, which is used to define the reversible process of penetration by, or containment or entrapment of, hydrogen on the surface of a zeolite rho or in zeolite rho pores, also referred to as cages or channels. Thus, the terms "encapsulation" or "encapsulated" as used herein are meant to include, but not be limited to, entrapment, occlusion, imbibation, intercalation, persorption, sorption, adsorption, and absorption.

Another possible non-limiting application for the above-defined Cd-exchanged zeolite rho compositions involves the storage of hydrogen, which is a potential renewable fuel source. Before it can be effectively utilized as a fuel in car engines or other power producing devices, a safe and convenient storage method needs to be developed that can store large amounts of hydrogen gas and easily release it at a consistent rate. The above-described compositions may be very useful in exactly such a storage application when placed in contact with hydrogen.

EXAMPLES

In all the following non-limiting encapsulation examples, experiments were performed in a stainless steel microreactor having an empty volume of 1.5 mL. The inventive Cd-exchanged zeolite rho powder compositions used were formed into pellets of approximately 1 mm in diameter. About 30 mg of the pellets were spread suitably to minimize the aspect ratio (axial length/diameter) of the bed. Pure hydrogen was fed into the reactor for a desired time and at a desired temperature. The exit stream of the reactor led into the inlet of a mass spectrometer (NUCLIDE 12-90-G) where the pressure was carefully maintained by an inlet pump and an inlet valve. The signal (in this case hydrogen) was measured by an electron multiplier and recorded by a data acquisition system.

Unless otherwise specified, all percentages reported below are in weight percent.

EXAMPLE 1

Preparation of Na/Cd/Cs-Rho Zeolite (w≅5)

The starting Na/Cs-zeolite rho material was prepared using the procedure described in U.S. Pat. No. 3,904,738. 252 mL of Ludox® LS-30, commercially available from E. I. du Pont de Nemours and Company, Wilmington, DE, was added to a solution containing 70 mL of 4M $NaAlO_2OH$, 11.2 g NaOH, and 19.6 mL 50% CsOH. The mixture was shaken until homogeneous in appearance, and was allowed to stand at room temperature for 5 days. The mixture was then heated to 100° C. for 7 days. The mixture was filtered, washed, and dried. The resulting material analyzed as $Na_{6.7}Cs_{3.0}Si_{36.3}Al_{11.7}O_{96}$. Analysis of the oxygen content in all examples was not performed but assumed to be $O_{96}$. The x-ray diffraction pattern indicated that the material was a zeolite rho.

This zeolite rho was then ion-exchanged six times with a 10% $NaNO_3$ solution at 90° C. for 1 hour. The resultant solution was further ion-exchanged six times with a 10% $Cd(NO_3)_2$ solution at 90° C. for 1 hour. Separation of solids and liquids between exchanges was achieved by centrifugation. The final form of zeolite rho produced by such ion-exchange had the formula $Na_{0.02}Cs_{1.87}Cd_{5.05}Si_{36}Al_{12}O_{96}$ as determined by inductively coupled plasma analysis (ICP).

Before encapsulation with hydrogen, the sample was pre-treated to ensure complete removal of moisture from the zeolite rho framework. The sample was outgassed on a vacuum line and heated simultaneously in steps of 50° C. The pressure was carefully monitored after every step change. No further change in temperature was effected until the pressure stabilized at the lowest possible value. The procedure was repeated until the final temperature reached 400° C. The sample was then outgassed at this temperature for about 3 days at a pressure of 0.005 mtorr (6.7×10$^{-6}$ Pa), before being transferred to the microreactor under inert conditions.

EXAMPLE 2

Encapsulation of the Cd-Exchanged Zeolite Rho with Hydrogen

The pre-treated Cd-exchanged zeolite rho from Example 1 was heated on-line in argon to 400° C. until the water signal reached a minimum in the mass spectrometer (NUCLIDE 12-90-G). To ensure that the signal was at a minimum, the inert argon gas was routed through a bypass and the water signal was measured and compared with the stream coming from the reactor.

A pure hydrogen stream was passed over the bed. Hydrogen gas was encapsulated at 50° C., 100° C., 125° C., 150° C., and 200° C. over periods of 1, 2, 4 or 6 hrs. The zeolite rho was rapidly cooled down to room temperature while still under the hydrogen stream. The gas stream was then switched to argon at room temperature and flushed for 15 minutes to remove weakly held hydrogen. Argon and hydrogen flow rates were each 30 cc/min.

The zeolite sample was then heated from 30° C. to about 400° C. and 550° C. using heating rates of 10° C/min and 25° C/min. The voltage, as measured by the electron multiplier, was converted into concentration by calibration with a 0.5% $H_2$/Ar mixture. The area under the curve was integrated to provide the total amount of $H_2$ encapsulated and desorbed by the zeolite rho. Results are shown in Table 1 below.

TABLE 1

| Temp ° C. | Time hr | Peak 1 ° C. | Peak 2 ° C. | Peak 3 ° C. | Ramp ° C./min | Amount $H_2$ µmol/g |
|---|---|---|---|---|---|---|
| 50 | 2 | 90 | — | — | 18 | 71 |
| 50 | 2 | 100 | — | — | 24 | 70 |
| 50 | 4 | 102 | — | — | 18 | 85 |
| 50 | 6 | 101 | — | — | 18 | 88 |
| 100 | 2 | 109 | — | — | 24 | 161 |
| 100 | 4 | 112 | 213 | — | 24 | 213 |
| 100 | 6 | 120 | 215 | — | 24 | 263 |
| 200 | 0.5 | 106 | 286 | 343 | 24 | 519 |
| 200 | 1 | 107 | 280 | 341 | 24 | 526 |
| 200 | 2 | 107 | 298 | 340 | 24 | 616 |

Table 1 shows that an increase in time will increase the opportunity for diffusion and that hydrogen uptake is enhanced. Increasing temperature also increased hydrogen uptake.

EXAMPLE 3

Preparation of Na/Cs/Cd-Rho Zeolite (w≅6)

The starting Na/Cs-zeolite rho material was prepared using the procedure of Example 1 except that 16 g of Na/Cs-zeolite rho was contacted 8 times with an $NH_4NO_3$ solution (16.6 g $NH_4NO_3$/166 mL $H_2O$) at 90° C. for 1 hr. each time. 10 g of the resulting $NH_4$-rho zeolite was contacted 8 times with an $NaNO_3$ solution (10 g $NaNO_3$/100 mL $H_2O$) at 90° C. for 1 hr. each time. Approximately 10 g of the resulting Na-zeolite rho was then contacted 8 times with a $Cd(NO_3)_2$ solution (10 g $Cd(NO_3)_2$/100 mL $H_2O$).

The resulting Cd-exchanged-zeolite rho composition analyzed by ICP was $Na_{0.02}Cs_{0.06}Cd_{5.73}Si_{36.46}Al_{11.54}O_{96}$.

Before encapsulation with hydrogen, the sample was pre-treated as in Example 1 to ensure complete removal of moisture from the zeolite rho framework.

EXAMPLE 4

Encapsulation of the Cd-exchanged Zeolite Rho with Hydrogen

The pre-treated Cd-exchanged zeolite rho from Example 3 was loaded in a gas chromatographic column and heated overnight at 400° C. in He flow. A pure hydrogen stream was passed over the pre-treated zeolite rho. Hydrogen gas was encapsulated at 200° C. over periods of 1 or 2 hrs, similar to Example 2, but as more specifically set forth in Table 2 below.

TABLE 2

| Temp ° C. | Time hr | Peak 1 ° C. | Peak 2 ° C. | Ramp ° C./min | Amount $H_2$ (µmol/g) |
|---|---|---|---|---|---|
| 200 | 1 | 389 | 440 | 25 | 1451 |
| 200 | 2 | 394 | 435 | 25 | 2168 |
| 200 | 2 | 360 | 408 | 15 | 1970 |
| 200 | 2 | 377 | 420 | 20 | 2169 |

EXAMPLE 5

Simulated Removal of Hydrogen

A gas chromatographic column was loaded with Cd-exchanged zeolite rho ($Na_{0.02}Cs_{0.06}Cd_{5.73}Si_{36.46}Al_{11.54}O_{96}$) prepared using the method of Example 3, and heated overnight at 400° C. in He flow. Injections of pure samples of $H_2$, HCl, $N_2$, $CH_4$ and air were separately injected into a HP 5990 gas chromatograph (GC) using a helium carrier stream at temperatures between 30° C. and 300° C. The changes in peak intensity with column temperature are shown in Tables 3–5. The decrease in peak intensity for $H_2$ indicates preferential sorption of $H_2$ over HCl, $N_2$ or $CH_4$.

TABLE 3

Gas flow: He, TCD: 42.7 sccm (7.12 × 10$^{-8}$ m³/s); Col: 23.9 sccm (3.98 × 10$^{-8}$ m³/s)

| Temp (° C.) | Compound | Injection size | Retention Time (min.) | Peak Ht. | Peak Area |
|---|---|---|---|---|---|
| 30 | Methane | 100 µL | 0.39 | 325 | 6925 |
|  | $N_2$ | 100 µL | 0.41 | 324 | 6906 |
|  | $N_2$ | 100 µL | 0.40 | 336 | 7096 |
|  | $H_2$ | 500 µL | 0.18 | 375 | 3353 |
|  | $H_2$ | 500 µL | 0.18 | 389 | 3341 |
| 50 | Methane | 100 µL | 0.32 | 310 | 5932 |
|  | $N_2$ | 100 µL | 0.31 | 330 | 5993 |
|  | $N_2$ | 100 µL | 0.31 | 330 | 6775 |
|  | $H_2$ | 500 µL | 0.17 | 411 | 3330 |
|  | $H_2$ | 500 µL | 0.16 | 407 | 3374 |
| 200 | Methane | 100 µL | 0.15 | 495 | 6560 |
|  | $N_2$ | 100 µL | 0.17 | 500 | 6741 |
|  | $N_2$ | 100 µL | 0.16 | 470 | 6655 |
|  | $H_2$ | 100 µL | 0.10 | 400 | 5618 |
|  | $H_2$ | 100 µL | 0.16 | 89 | 1142 |

TABLE 4

Gas flow: He, TCD: 42.7 sccm (7.12 × 10$^{-8}$ m$^3$/s); Col: 12.0 sccm (2.00 × 10$^{-8}$ m$^3$/s)

| Temp (° C.) | Compound | Injection size | Retention Time (min.) | Peak Ht. | Peak Area |
|---|---|---|---|---|---|
| 50 | Methane | 100 μL | 0.70 | 254 | 8938 |
|  | Methane | 100 μL | 0.70 | 255 | 9222 |
|  | N$_2$ | 100 μL | 0.69 | 252 | 7999 |
|  | N$_2$ | 100 μL | 0.68 | 307 | 8951 |
|  | H$_2$ | 500 μL | 0.32 | 215 | 4120 |
|  | H$_2$ | 500 μL | 0.32 | 225 | 4273 |
| 250 | Methane | 100 μL | 0.28 | 517 | 10971 |
|  | N$_2$ | 100 μL | 0.27 | 524 | 10777 |
|  | N$_2$ | 100 μL | 0.28 | 525 | 10757 |
|  | H$_2$ | 500 μL | 0.22 | 14 | 1668 |
|  | H$_2$ | 500 μL | 0.22 | 15 | 267 |
|  | Air | 100 μL | 0.27 | 361 | 7248 |

TABLE 5

Gas flow: He, TCD: 42.7 sccm (7.12 × 10$^{-8}$ m$^3$/s); Col: 6.0 sccm (1.00 × 10$^{-8}$ m$^3$/s)

| Temp (° C.) | Compound | Injection size | Retention Time (min.) | Peak Ht. | Peak Area |
|---|---|---|---|---|---|
| 50 | Methane | 100 μL | 1.17 | 212 | 14003 |
|  | Methane | 100 μL | 1.27 | 190 | 14192 |
|  | N$_2$ | 100 μL | 1.15 | 188 | 12804 |
|  | N$_2$ | 100 μL | 1.16 | 197 | 13548 |
|  | H$_2$ | 500 μL | 0.56 | 125 | 4598 |
|  | H$_2$ | 500 μL | 0.58 | 111 | 3922 |
|  | HCl | 1 mL | 0.35 | 5 | 225 |
|  |  |  | 1.58 | 6 | 320 |
| 100 | Methane | 100 μL | 0.82 | 219 | 10307 |
|  | N$_2$ | 100 μL | 0.83 | 246 | 11576 |
|  | N$_2$ | 100 μL | 0.82 | 236 | 11273 |
|  | H$_2$ | 500 μL | 0.54 | 78 | 2248 |
|  | H$_2$ | 500 μL | 0.49 | 117 | 3548 |
|  | HCl | 1 mL | 0.35 | 2 | 182 |
|  |  |  | 0.85 | 16 | 1423 |
| 150 | Methane | 100 μL | 0.65 | 190 | 7902 |
|  | N$_2$ | 100 μL | 0.63 | 220 | 8750 |
|  | N$_2$ | 100 μL | 0.64 | 198 | 8124 |
|  | H$_2$ | 500 μL | 0.47 | 41 | 954 |
|  | H$_2$ | 500 μL | 0.43 | 39 | 1913 |
|  | HCl | 1 mL | 0.57 | 45 | 2267 |
| 200 | Methane | 100 μL | 0.54 | 324 | 14238 |
|  | N$_2$ | 100 μL | 0.54 | 299 | 12707 |
|  | N$_2$ | 100 μL | 0.54 | 309 | 12898 |
|  | H$_2$ | 500 μL | 0.48 | 12 | 283 |
|  | H$_2$ | 500 μL | 0.48 | 12 | 294 |
|  | HCl | 1 mL | 0.54 | 78 | 3399 |
| 250 | Methane | 100 μL | 0.50 | 234 | 7905 |
|  | N$_2$ | 100 μL | 0.48 | 212 | 7905 |
|  | N$_2$ | 100 μL | 0.49 | 216 | 7358 |
|  | H$_2$ | 500 μL | — | — | — |
|  | H$_2$ | 500 μL | — | — | — |
|  | HCl | 1 mL | 0.46 | 59 | 2180 |
| 300 | Methane | 100 μL | 0.46 | 270 | 8257 |
|  | N$_2$ | 100 μL | 0.45 | 242 | 765 |
|  | N$_2$ | 100 μL | 0.42 | 216 | 6818 |
|  | H$_2$ | 500 μL | — | — | — |
|  | H$_2$ | 500 μL | — | — | — |
|  | HCl | 1 mL | 0.34 | 43 | 2188 |

Tables 3–5 demonstrate the potential ability of the Cd-exchanged zeolite rho compositions to selectively remove hydrogen from a process stream.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

We claim:

1. A method of separating and removing hydrogen from a hydrogen-containing process stream, wherein the hydrogen is admixed in the stream with at least one other gas member, comprising contacting a hydrogen-containing process stream containing at least one other gas member with a Cd-exchanged zeolite rho composition of the formula:

$$Cd_wM1_xM2_yM3_zSi_aAl_bO_{96}$$

wherein:

M1, M2 and M3 are each selected from the group consisting of Li, Zn, Rb, Sr, H, Mg, Ba, NH$_4$, Ca, K, Na and Cs;

w is from about 1 to about 6;

x, y and z are each 0–6;

a is 36–48; and b is 0–12, with the proviso that a+b=48.

2. The method of claim 1 wherein w is about 5 or about 6.

3. The method of claim 1 wherein at least one of x, y, or z is greater than zero.

4. The method of claim 1 wherein M1 is Cs, x is about 2, and w is about 5.

5. The method of claim 1 wherein w is about 6 and x, y, and z are all zero.

6. The method of claim 1 wherein the Si:Al molar ratio is from about 3:1 to about 5:1.

7. The method of claim 1 wherein contacting occurs at a pressure between about 1 and about 900 atmospheres and a temperature between about 50 and 500° C.

8. The method of claim 7 wherein contacting occurs at about 1 atmosphere and about 100 to 300° C.

9. The method of claim 1 wherein the process stream contains hydrogen in concentrations of from about 0.0001 to about 15 wt. %.

10. The method of claim 1 wherein the hydrogen-containing process stream also contains at least one gaseous member selected from the group consisting of HCl, HF, HBr, HI, Cl$_2$, N$_2$, CO, CO$_2$, Ne, Ar, Kr, Xe, He, NH$_3$, CH$_4$, air and H$_2$O.

11. The method of claim 1 wherein the hydrogen-containing process stream resulted from the hydrodechlorination of halocarbons.

12. The method of claim 1 wherein the hydrogen-containing process stream resulted from the processing or production of chlorinated compounds.

13. The method of claim 1 wherein the hydrogen-containing process stream resulted from a plasma-chemical process involving hydrogen.

14. The method of claim 1 wherein the hydrogen-containing process stream resulted from the production of HCN.

* * * * *